United States Patent [19]

Uchida

[11] 4,319,326
[45] Mar. 9, 1982

[54] ELECTRONIC CASH REGISTER SYSTEM WITH CONSOLIDATING MEANS

[75] Inventor: Yoritoshi Uchida, Yawata, Japan

[73] Assignee: Omron Tateisi Electronics Co., Kyoto, Japan

[21] Appl. No.: 129,319

[22] Filed: Mar. 11, 1980

[30] Foreign Application Priority Data

Apr. 3, 1979 [JP] Japan .................................. 54-41460

[51] Int. Cl.³ ............................................ G06F 15/20
[52] U.S. Cl. .................................... 364/405; 364/900
[58] Field of Search ................ 364/405, 404, 900, 200

[56] References Cited

U.S. PATENT DOCUMENTS

| | | | |
|---|---|---|---|
| 3,596,256 | 7/1971 | Alpert et al. | 364/200 |
| 3,899,775 | 8/1975 | Larsen | 364/900 |
| 4,107,784 | 8/1978 | Bemmelen | 364/900 |
| 4,213,179 | 7/1980 | Hamano et al. | 364/405 |

*Primary Examiner*—David H. Malzahn
*Attorney, Agent, or Firm*—Wegner & Bretschneider

[57] ABSTRACT

Electronic cash register system comprising a plurality of electronic cash registers and a consolidator unit associated with said cash registers, each of the cash registers including a register storage means for storing data entered into the register by an operator and communicating means for transmitting the data stored in the register storage means to the consolidator unit, the consolidator unit including a consolidator storage means for storing the data transmitted from said communicating means in a discrete storage area thereof corresponding to the operator, and the communicating means being operative when a cash register operator retires from one of said cash registers.

6 Claims, 7 Drawing Figures

FIG. 3A
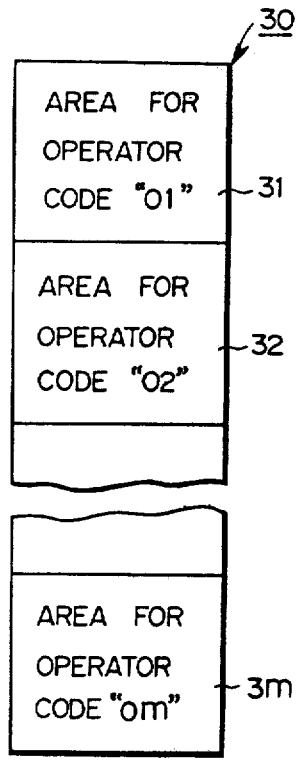
FIG. 3B
| ADDRESS \ BIT | NUMBER | AMOUNT | |
|---|---|---|---|
| DISCOUNT | | | } 310 |
| SURCHARGE | | | } 311 |
| CASH | | | } 312 |
| CHECK | | | } 313 |
| CHARGE | | | } 314 |
| RECEIPT | | | } 315 |
| DISBURSEMENT | | | } 316 |
| REFUND | | | } 317 |
| GOODS RETURN | | | } 318 |
| NON-SALE ACCOUNT | | | } 319 |
FIG. 5
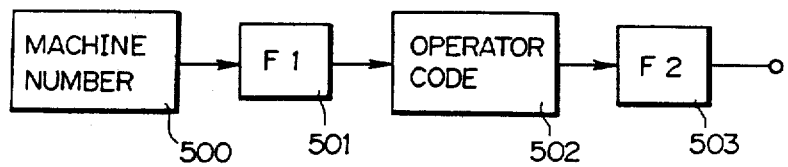

DATA 43

DATA 47

DATA 55

DATA 56

DISCOUNT
          345-789012
    SURCHARGE
          567-901234
    CASH
          789-123456
    CHECK
          101- 75000
    CHARGE
          123- 67000
    RECEIPT
          234-265456
    DISBURSEMENT
           56-200000
    REFUND
           78-  2345
    GOODS RETURN
           90- 34567
    NON-SALE ACCOUNT
              345
1234#

REPORT NR.
```

ELECTRONIC CASH REGISTER SYSTEM WITH CONSOLIDATING MEANS

BRIEF SUMMARY OF THE INVENTION

The present invention relates to an electronic cash register system having a plurality of electronic cash registers and a consolidator unit, and more particularly to an improved system in which when an operator of one of the cash registers is relieved or transferred to another cash register, the data based on the information entered by that operator are accumulated by the consolidator unit, so that the data corresponding to each operator may be accumulated and processed.

Electronic cash registers which are able to rapidly and easily register and process input data are widely utilized in supermarkets and stores. For sound financial management, it is necessary for the owner or floor manager to total all the itemized sales data for each operator or select and analyze the various data entered by each operator, such as data as to goods sold well, or analyze data to find the composition of sales made to each customer.

Electronic cash registers which are used in a retail outlet on a relatively small scale each comprises a memory having data storage areas corresponding to respective operators, wherein after closing the shop for the day, the owner operates each of the cash registers to read out the data entered by the respective operators stored in the corresponding storage areas and produce a print of the read out data. However, since each of such cash registers comprises a memory including discrete storage areas corresponding to respective operators, the memory must have a large capacity sufficient to store the massive data. When the owner wants to obtain detailed information on the sales consummated on any single day, he must manually prepare various tables based on the printout from each cash register, which takes an exhaustive amount of labor and time to get the information he may desire.

In a large retail establishment equipped with a point-of-sale system, a plurality of electronic cash registers are coupled to a central processing unit on an on-line basis. The data registered in each of the registers are transmitted to the central processing unit on an on-line basis for collection and processing in the latter. Since the central processing unit in such a system is coupled to each cash register on an on-line basis, the system has the advantages of fast data processing speed and reduced labor requirements. A disadvantage, however, is that a costly large scale computer is required as the central processor.

It is, therefore, a primary object of the present invention to provide an inexpensive electronic cash register system comprising a plurality of electronic cash registers and a consolidator unit, which is able to automatically accumulate various kinds of data based on the registering operations of respective operators and produce desired tables based on the accumulated data, all at reduced cost.

It is another object of the present invention to provide an electronic cash register system comprising a plurality of electronic cash registers and a consolidator unit, in which each of the cash registers includes a memory for use by a plurality of operators in common and by return, the system requiring a small storage capacity for each cash register and being inexpensive as a whole.

According to one aspect of the present invention, there is provided an electronic cash register system comprising a plurality of electronic cash registers, each of which includes a register storage means for use in common by a plurality of operators, i.e., for storing the information entered by them, and a consolidator unit which includes a consolidator storage means for cumulating the data based on the information entered by operators at the cash registers over a predetermined time period and storing the cumulated data, the cumulation and storage of information in the consolidator unit being made for each operator, wherein when an operator is relieved from one of the cash registers, the data thus far registered by him and stored in the register storage means are transferred to the consolidator unit and cumulatively stored in the storage areas corresponding to the operator in the consolidator storage means, and said consolidator unit remote controls the electronic cash register which has transferred the data thereto so as to set the particular register to a liquidation mode, thereby producing a manager report and clearing its register storage means so that the register storage means may store the input data that will be entered by another operator who may take over the registering operation.

Other objects and advantages of the present invention will be apparent upon reference to the following description in conjunction with the accompanying drawings, in which:

BRIEF DESCRIPTION OF DRAWINGS

FIGS. 3A and 3B are illustrations showing the storage areas of the RAMs employed in the system of FIG. 2;

FIG. 5 is an illustration showing the operation to be executed by an operator in the system of FIG. 2;

FIG. 7 is a table showing a printout format of a Z liquidation report produced by the system of FIG. 2.

DETAILED DESCRIPTION

Figure 1:
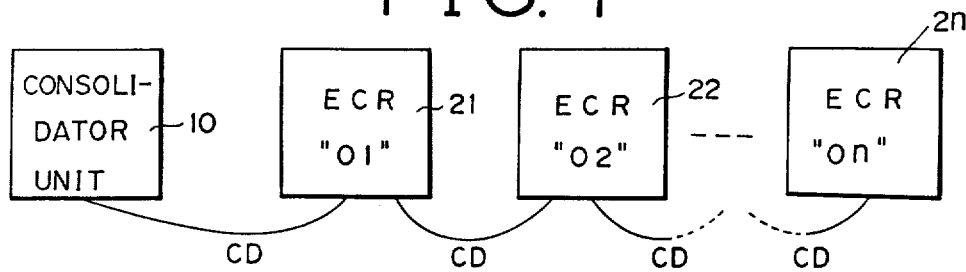
FIG. 1 is a schematic block diagram of an electronic cash register system as a preferred embodiment of the present invention.
Figure 2:
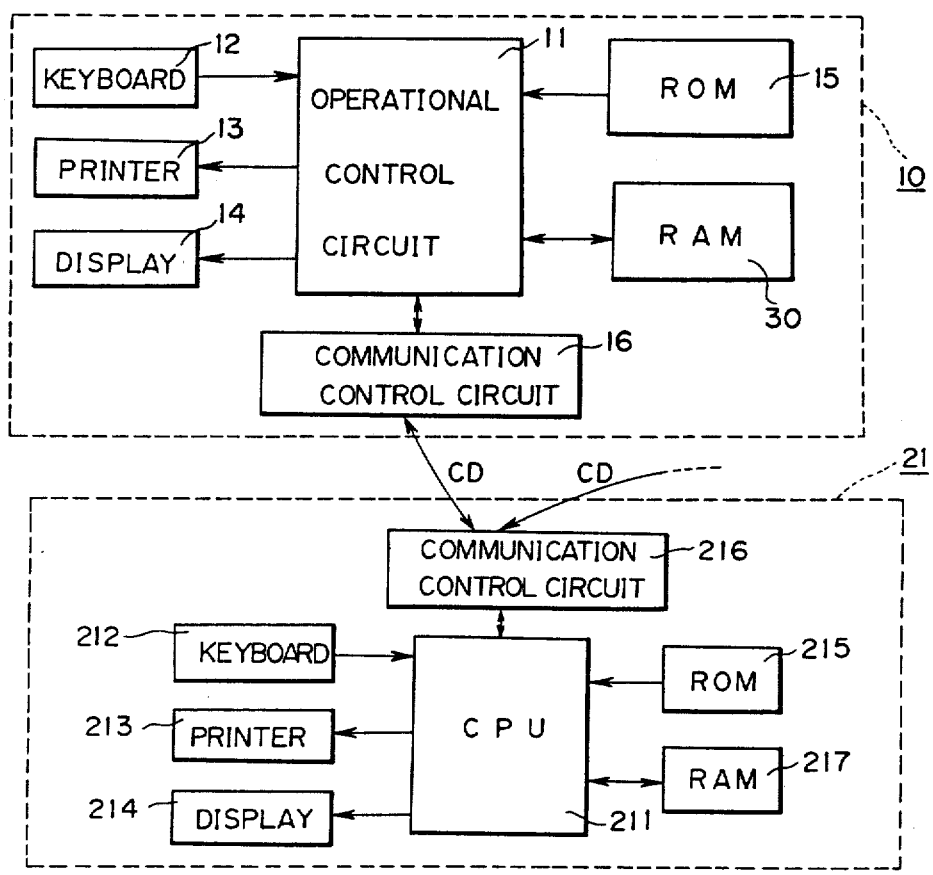
FIG. 2 is a detailed block diagram of the system of FIG. 1.

Referring, now, to FIG. 1, there is shown a schematic block diagram of an electronic cash register system comprising a consolidator unit 10 and a plurality of electronic cash registers 21, 22, ... 2n connected to the consolidator unit 10 via communication line CD, as a preferred embodiment of the present invention. In FIG. 2, for the convenience of the illustration of the present invention, there is shown, in detail, only the consolidator unit 10 and the electronic cash register (hereinafter referred to briefly as ECR) 21 of the system of FIG. 1. The other ECRs 22 ... 2n have the same constructions as that of the ECR 21, respectively. The consolidator unit 10 comprises an operational control circuit 11 including a microprocessor, a keyboard 12 including numeral keys and function keys, a printer 13 for producing a printout of various processed data in the unit 10, a display 14 for displaying information entered through the keyboard 12 and the various processed data, a read only memory (hereinafter referred to briefly as ROM)

15 which stories a control program for collection and control of the data registered in the ECRs for each operator, a random access memory (hereinafter referred to briefly as RAM) 30 including discrete storage areas corresponding to respective operators, and a communication control circuit 16 for controlling the transmission and reception of the data between the consolidator unit 10 and the plural ECRs 21 through 2n.

The ECR 21 comprises a central processing unit (hereinafter referred to briefly as CPU) 211, a keyboard 212) which includes numeral keys for entering the amount of money for each item of merchandise sold, department keys for entering the respective counter or department codes asigned to merchandise sold, a total key, keys for entering at the end of a transaction the mode of customer's payment, e.g., cash, check or charge, a surcharge key, a discount key, a refund key, a goods return key, a non-sale account key, or the like. The ECR 21 further comprises a printer 213 for issuing a receipt printed with the information registered in the ECR 21, a display 214, a ROM 215, a communication control circuit 216, and a RAM 217. The communication control circuit 16 of the consolidator unit 10 is connected via the communication line CD to the communication control circuit 216 of the ECR 21 and other communication control circuits of the ECRs 22 . . . 2n.

FIG. 3A is an illustration showing storage areas 31, 32 . . . 3m of the RAM 30 corresponding to respective operators. FIG. 3B shows the data which are stored in the RAM 217 and the respective storage areas 31, 32 . . . 3m for operators. The storage areas 31, 32 . . . 3m of the RAM 30 and the RAM 217 each includes a storage area 310 for storing discount sale data, a storage area 311 for storing surcharge sale data, a storage area 312 for storing cash payment data, a storage area 313 for storing check payment data, a storage area 314 for storing charge payment data, a storage area 315 for storing receipt-of-money data, a storage area 316 for storing disbursement-of-money data, a storage area 317 for storing refund-of-money data, a storage area 318 for storing goods return data, and a storage area 319 for storing non-sale account data. The storage areas 310 through 318 each is adapted to store the number of transactions corresponding to the respective data in 2 bytes and the cumulative amount of money corresponding to the respective data in 4 bytes. The storage area 319 is adapted to store the number of non-sale account transactions in 2 bytes.

Figure 4:
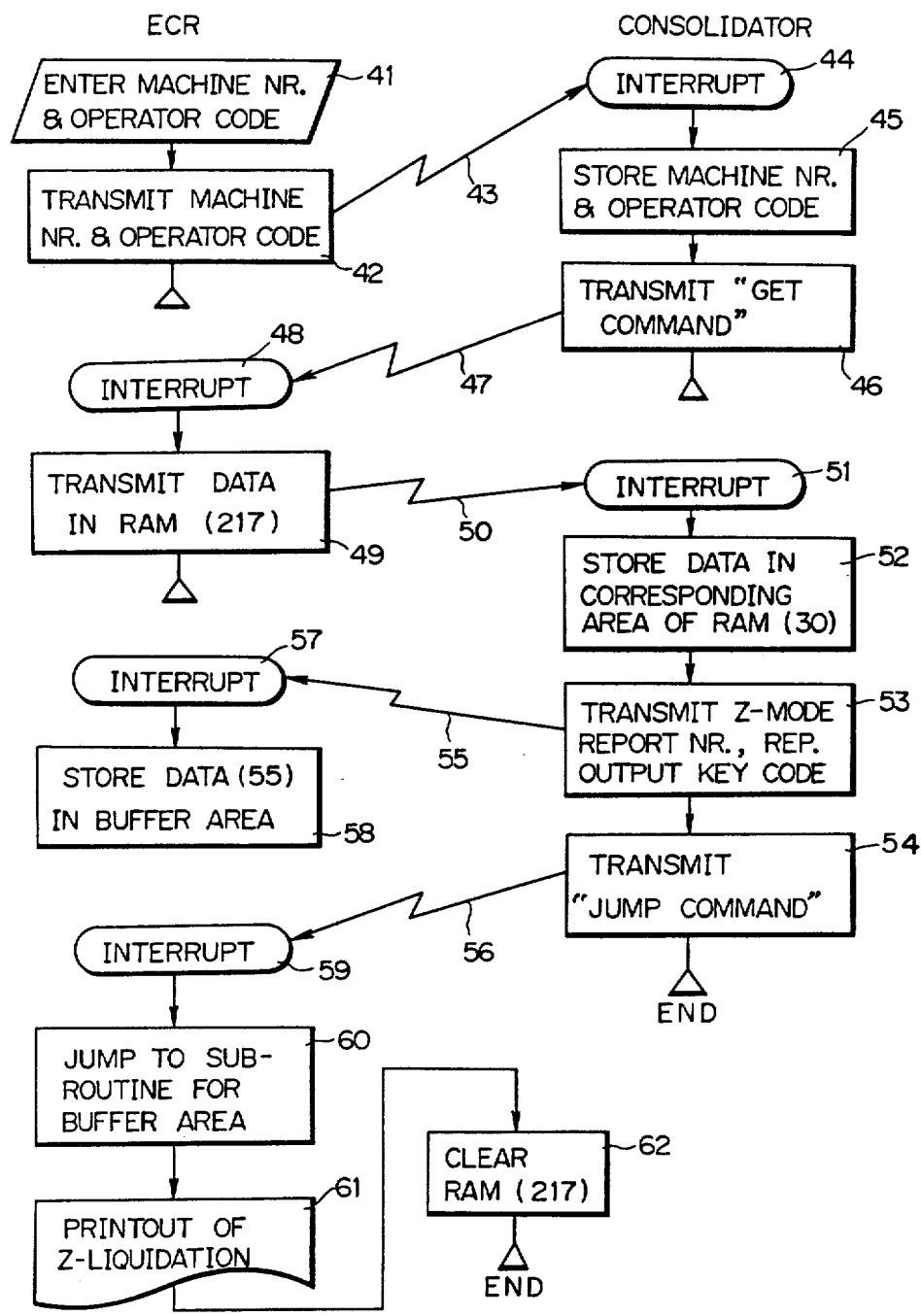
FIG. 4 is a flow chart illustrating the operation of the system of FIG. 2.
Figure 6:
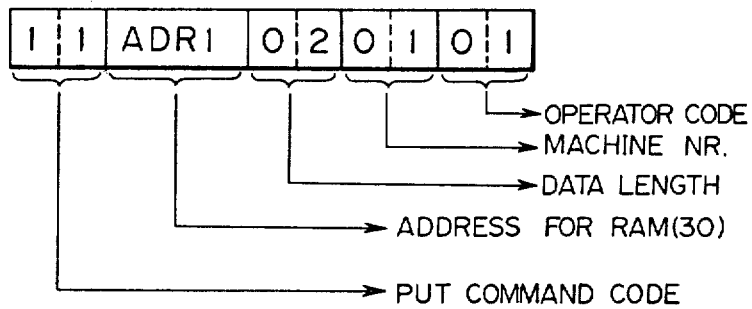
FIG. 6 is an illustration showing the data transmission formats within the system of FIG. 2.
Figure 6:
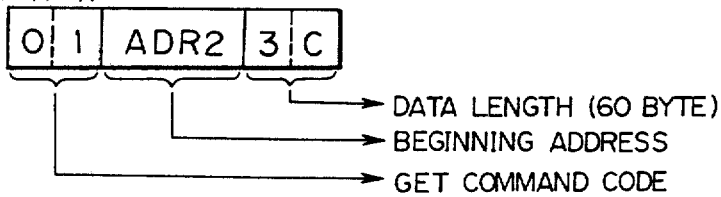
Figure 6:
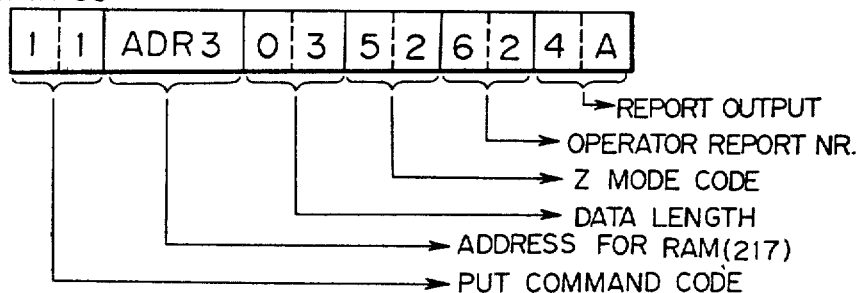
Figure 6:
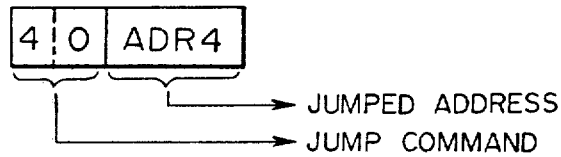

In FIG. 4 there is shown a flow chart illustrating the operation of the system of FIG. 2. The flow chart includes steps 41, 42, 43 to 46, 48, 49, 51 to 54, and 57 to 62. FIG. 5 shows the operation to be executed by an operator at his retirement from the shift. FIG. 6 shows the data transmission formats applicable between the consolidator unit 10 and the ECR 21 when an operator retires or moves to another cash register.

FIG. 7 shows a printout format of a manger report or a Z liquidation report which is produced by the ECR 21 when an operator retires from the ECR.

The operation referring to FIGS. 1 through 7 will be described in detail hereinafter.

In a normal operation, the RAM 217 at the respective corresponding storage areas stores the various data based on the information entered by an operator through the keyboard 212, such as the number of transactions and the cumulative amount of money for each of the discount sale, surcharge sale, cash payment, check payment, charge payment, receipt of money, disbursement of money, refund of money and goods return, or the number of transactions in non-sale account. The data transmission from the ECR 21 to the consolidator unit 10 is not yet made then.

Referring to FIG. 5 and FIG. 4, when the operator in charge of the ECR 21 having a machine number "01" retires from the machine, he enters the machine number through the numeral keys of keyboard 212 and depresses a function key F1 specifying the numerical information inputed by the numerical keys for the machine number (steps 500, 501 and 41). After depressing the function key F1, the operator enters his operator code "01" through the numeral keys and depresses a function key F2 which specifies the information inputed by the numeral keys as the operator code (steps 502, 503 and 41). The function keys F1 and F2 may be independently disposed in the keyboard 212 or be combined with other function keys. Thus, when the operator retires from the ECR 21, the machine number "01" and the operator code "01" are applied to the CPU 211. The CPU 211 transmits transmission data 43 (shown in FIG. 6) to the operational control circuit 11 of the unit 10 through the communication control circuit 216, communication line CD and communication control circuit 16 (step 42). The transmission data 43 includes two data of the machine number "01" and the operator code "01", a data length "02" representing the length of the two data in the data 43, an address "ADR 1" for designating a storage area of the RAM 30 so as to store the above two data, and a PUT command code or an instruction word "11" for instructing the unit 10 to load the data 43. Upon the transmission of the data 43, the operational control circuit 11 of the consolidator unit 10 moves to an interruption mode from a normal mode, and instructs the RAM 30 at the designated address to store the machine number and operator code included in the transmission data 43 (steps 44 and 45).

Consequently, the operational control circuit 11 transmits a transmission data 47 to the ECR 21 corresponding to the machine number included in the data 43 (step 46). The transmission data 47 includes a data length "3C" of data which may be stored in the corresponding storage area in the RAM 30; its byte value being 3C=60 bytes, a beginning address or most significant digit (MSD) "ADR 2" of the storage area corresponding to the operator code in the RAM 30, and a GET command code or an instruction word "01" which instructs the ECR 21 to transmit the data stored therein to the consolidator 10. When the transmission data 47 is transmitted to the CPU 211 through control circuit 16, communication line CD and control circuit 216, the CPU 211 of the ECR 21 transmits to the consolidator unit 10 the data 50 which has been stored so far in the RAM 217 relating to the registering operation by the operator (step 49).

The operation control circuit 11 of the unit 10 instructs the storage area 31 of the RAM 30 corresponding to the operator code "01" to store the data 50 as to the information registered by the operator in the ECR 21 (step 52). Namely, the control circuit 11 allows the operator storage area 31 corresponding to the operator code "01" to cumulatively store the the data 50 transmitted from the ECR 21 for each transaction, viz. the number of transactions and the cumulative amount of money for each of discount, surcharge, cash, check, charge, receipt, disbursement, refund, goods return and non-sale account.

Subsequently, the operational control circuit 11 transmits a transmission data 55 to the ECR 21 (step 53). The transmission data 55 includes three data of a Z mode code "52" for instructing the ECR 21 to make a liquidation, an operator report number "62" and a report output key code "4A", a data length "03" of the above three data, an address (ADR 3) for designating a buffer area in the RAM 217 so as to store the above-mentioned three data, and a PUT command code "11" for instructing the ECR 21 to load the transmission data 55. Upon transmission of the data 55 to the ECR 21, the CPU 211 of the ECR moves to an interruption mode and instructs the RAM 217 to store in the buffer area the Z mode code, operator report number and report output key code (steps 57 and 58).

Further, the control circuit 11 of the unit 10 transmits a transmission data 56 to the ECR 21 (step 54). The transmission data 56 includes a jump command code "40" and an address "ADR 4" for accepting such a jump command. The consolidator unit 10 has now completed its operation.

Meanwhile, in the ECR 21, in response to the transmission data 56, the CPU 211 designates the jumped address which is stored in the ROM 215, and advances to produce a Z liquidation report in accordance with a program or Z report program stored in the ROM 215 (steps 59 to 61). Namely, the CPU 211 reads out the various data which are stored in the RAM 217 till the last operation by the operator, viz. the data about discount, surcharge, cash, check, charge, receipt, disbursement, refund, goods return, non-sale account or the like, and supplies the printer 213 with such various data to produce a Z report as shown in FIG. 7. The CPU 211 further instructs the printer 213 to produce a printout of the machine number of the ECR 21 and the report number, and clears the data stored in respective storage areas of RAM 217, thus completing its series of operations.

In the ECR 21, various data based on the information entered by the subsequent operators are now ready to be stored in the RAM 217.

Thus, according to the present invention there is provided an electronic cash register system which comprises a plurality of electronic cash registers each including register storage areas with relatively small storage capacity for storing the data based on the registering operation by a single operator and a consolidator unit including consolidator storage areas corresponding to respective operators for cumulatively storing the data based on the registering operation in a corresponding storage area for each change of operators. Such a system has the advantages that a plurality of storage areas corresponding to respective operators are simply disposed in a consolidator unit, the construction of the system is simple and inexpensive, and the system is able to quickly collect and store the data based on registering operations, for each operator and on a collective basis. The cash register system further has the advantages that each ECR is not required to be kept connected all the time to the consolidator unit through a communication line as needed in conventional systems, viz., data transmission between each ECR and consolidator unit is made only when an operator retires or moves to another ECR, so that the operation and data processing speed in the consolidator unit is reduced and the consolidator itself may be a compact and inexpensive one.

It should be understood that the above description is merely illustrative of the present invention and that many changes and modifications may be made by those skilled in the art without departing from the scope of the appended claims.

What is claimed is:

1. Electronic cash register system comprising a plurality of individually self-contained electronic cash registers and a consolidator unit associated with said cash registers, each of said cash registers including a data input means, a register storage means for storing data entered into the register by an operator through the data input means and communicating means for transmitting the data stored in said register storage means to said consolidator unit, said consolidator unit including a consolidator storage means for storing the data transmitted from each of said communicating means in a discrete storage area thereof corresponding to each said operator, each of said cash registers further including means for operating said communicating means upon entry of a predetermined data signal through said data input means at retirement of said cash register operator from said register to transmit to said consolidator storage means the data stored in said storage means at the time of operator retirement.

2. Electronic cash register system according to claim 1, wherein each cash register further comprises means responsive to the means for operating said communicating means for clearing the data stored in said register storage means after transmission of said data to said consolidator means.

3. Electronic cash register system according to claim 1, wherein on manual entry, by an operator through said data input means, of his code number and machine number into the cash register at his retirement from the register, said communicating means of the cash register corresponding to said keyboard starts to transmit the data stored in said register storage means to said consolidator storage means.

4. Electronic cash register system according to claim 1, wherein each of said cash registers further includes liquidating means for both providing a summary transaction report based on the data stored in said register storage means and then clearing the data in said register storage means once transmission of data stored in said register storage means to said consolidator storage means has taken place.

5. Electronic cash register system according to claim 4, wherein said liquidating means includes a printer adapted to produce a printout of the data stored in said register storage means before said data are cleared.

6. Electronic cash register system according to claim 4, wherein said liquidating means operates in response to an input through said data input means of operator code number and machine number data by an operator.

* * * * *